UNITED STATES PATENT OFFICE.

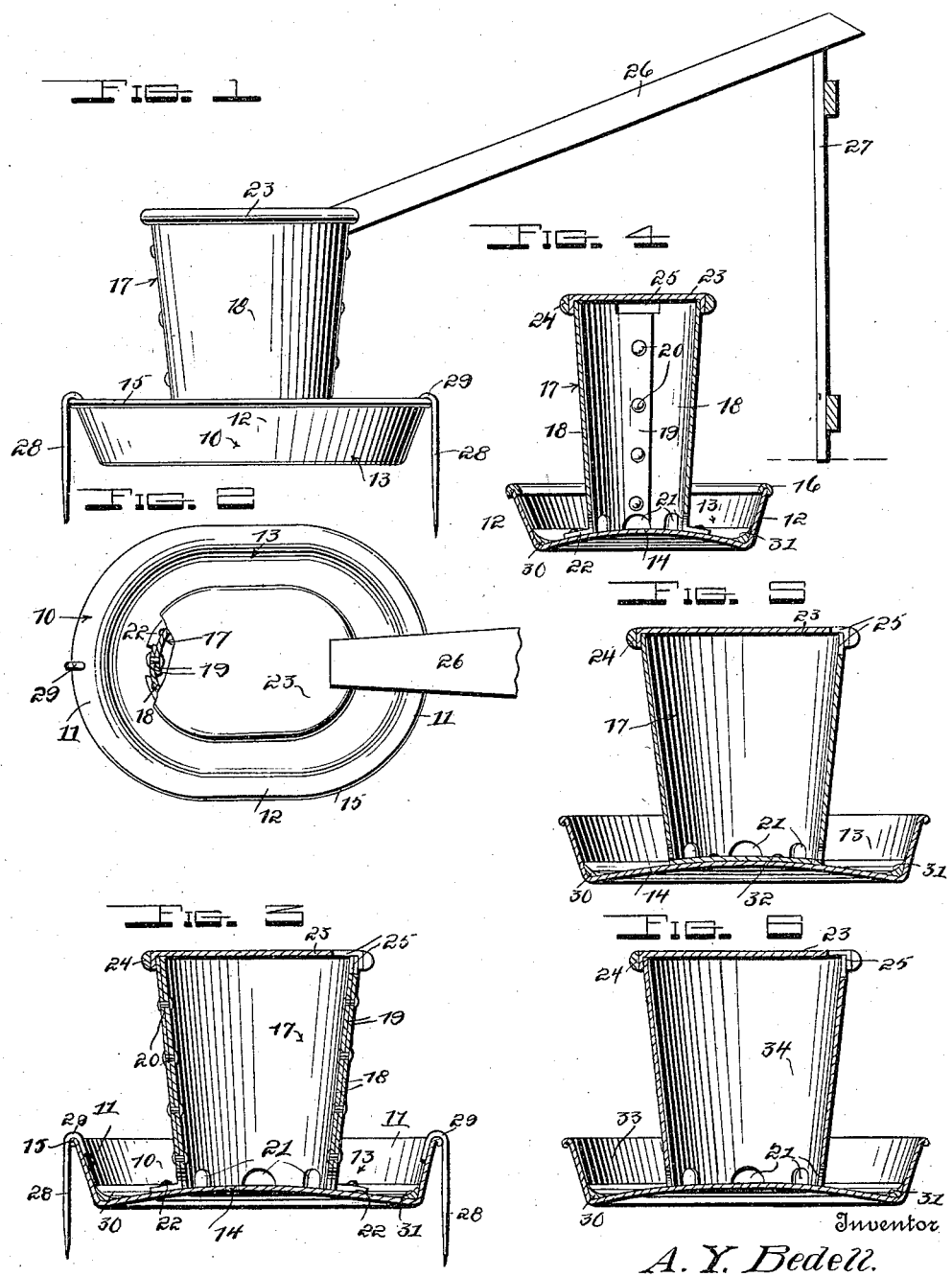

AMELIA Y. BEDELL, OF MARBLE ROCK, IOWA.

HOG-FEEDER.

1,176,193. Specification of Letters Patent. Patented Mar. 21, 1916.

Application filed June 19, 1912. Serial No. 704,606.

*To all whom it may concern:*

Be it known that I, AMELIA Y. BEDELL, a citizen of the United States, residing at Marble Rock, in the county of Floyd, State of Iowa, have invented certain new and useful Improvements in Hog-Feeders; and I do hereby declare the following to be a full, clear, and exact description of the invention, such as will enable others skilled in the art to which it appertains to make and use the same.

This invention has special reference to stock feeders and more particularly to hog feeders, the special object of the invention residing in the provision of a relatively circular tank of novel construction which prevents the hogs from jumping into the trough of the feeder and injuring each other, such as is occasioned by the ordinary elongated hog trough.

Another object of the invention consists of the provision of a hog feeder embodying a trough in the form of a pan receiving a tank therein for depositing the swill or corn into the trough and around the tank as the same is devoured and in which the tank is constructed whereby the same may be very economically produced.

With the above and other objects in view, the invention consists of certain other combinations and arrangement of parts as will be hereinafter more fully described, claimed and illustrated in the accompanying drawings, in which:—

In the drawings:—Figure 1 is a side elevation of my improved hog feeder showing the same position as when in use. Fig. 2 is a top plan view thereof with a portion of the cover broken away to more particularly illustrate the joint between the two sections forming the tank and the feeder. Fig. 3 is a longitudinal sectional view centrally of the feeder. Fig. 4 is a transverse sectional view. Fig. 5 is a central longitudinal sectional view showing a modified structure. Fig. 6 is a cross sectional view of a still further modified form of structure.

As illustrated in Figs. 1 to 4 inclusive, my improved hog feeder embodies a pan 10, the same being preferably constructed of sheet metal, the same being substantially circular or oval formation and being provided with circular end portions 11 and flat side portions 12. The pan 10 is further provided with a surrounding rim or upturned flange 13 which is raised or bent at an obtuse angle relative to the bottom portion of the pan, which bottom portion is raised or bent upwardly to provide a substantially conical portion as shown at 14 which gradually slopes toward the front portion of the pan and serves to feed the swill or corn by gravity thereto. The surrounding edge portion of the transverse rim 11 is rolled or bent back as shown at 15 or provided with a cast metal rim 16 so as to prevent injury to the animal's throat in gaining access to the trough.

Disposed centrally within the pan is a reservoir or tank 17, the same being of a similar form in plan to the pan and comprising two sections of sheet metal illustrated by the numeral 18 and each having their end portions provided with overlapped flanges 19 which are bolted together in such relation as shown at 20 to form a rigid structure. The bottom edge of each section is provided with a plurality of semicircular openings 21 and intermediate attaching tongues 2 which are bent in angular direction and secured to the bottom portion of the pan to securely anchor the tank thereon while the openings thus provided form a series of stalls around the tank or feeder from which the feed is distributed as hereinbefore specified so that one animal will be disposed at each opening and crowding and injury thereof will be prevented.

It will also be observed that the tank 17 tapers toward its bottom edge and thus forms a substantially hopper shaped member to further assist in the proper discharge of the feed while the upper end thereof is closed by a cover 23 having a reinforced surrounding flange 24 to protect the device and prevent injury thereof by the animals. The upper edge portion and an adjacent edge portion of the flange of the tank and the cover respectively, are provided with coacting recesses 25 through which the reduced end portion of a feed spout 26 which is supported in an inclined position upon a fence or partition 27 and which extends beyond one side thereof while the feeder is secured to the ground surface or other support by means of spikes 28 having hook shaped heads 29 engaged over the edge portion of the rim of the pan or trough which latter is spaced from said fence or partition to permit the animal to travel around the feeder.

In order to further reinforce the bottom portion of the pan or trough of the feeder, where the same is bent upwardly to form the rim, a cast metal reinforcing ring or rim 30 is fitted and secured to the interior face of the pan and provided with a concaved inner face 31 which also assists the animals in feeding. It will thus be observed that it will be impossible for the animals to jump into the trough or the feeder and since the swill or corn will be evenly distributed into the trough continuously around the tank, through the openings therein, any attempt to crowd will result in the animals traveling around the trough and injury will be thereby avoided. It is obvious that the feed spout provided also greatly assists in the filling of the tank, since it is only necessary to deposit the same on the spout at its enlarged portion and it will then pass into the tank by gravity and avoid the necessity of leaning over an ordinary trough and the animals surrounding the same as is now generally done.

In Fig. 5 of the drawings, a modified construction is shown, in which the bottom of the tank instead of being formed with a plurality of tongues or attaching feet is formed in one section as illustrated at 32, which section is secured to the pan in the usual manner and it will be obvious that by this structure, a double bottom will be produced which will increase the wearing qualities of the device.

In Fig. 6 of the drawings, the feeder is illustrated as being formed of an integral section of cast metal or granite, the pan being illustrated by the numeral 33 and the tank by the numeral 34 while the bottom portion of the same also forms the bottom of the tank.

From the foregoing description taken in connection with the accompanying drawings, it will be evident that a stock or hog feeder in the form provided will very efficiently serve the purpose for which it is designed and will avoid the objection heretofore noted. It also will be obvious that the device embodies a very simple structure which greatly reduces the cost of production of the feeder.

Having thus described my invention what is claimed is:

A feeder comprising a pan, a hopper centered therein having its wall formed of two sections of material each semi-elliptical in shape the ends of which overlap and are bolted together to form a rigid structure stronger at the ends than at the sides, a chute entering one end of the hopper at the top and resting on one of the overlapped portions of the two sections, the bottom edge of said hopper being provided with a plurality of semi-circular openings and intermediate attaching tongues bent outwardly of the hopper, bolts passed through said tongues and said pan to connect the latter to the hopper, and a removable cover for the hopper.

In testimony whereof, I affix my signature, in presence of two witnesses.

AMELIA Y. BEDELL.

Witnesses:
Jos. WILATH,
HARRY L. ACKLEY.

Copies of this patent may be obtained for five cents each, by addressing the "Commissioner of Patents, Washington, D. C."